(No Model.) 2 Sheets—Sheet 2.

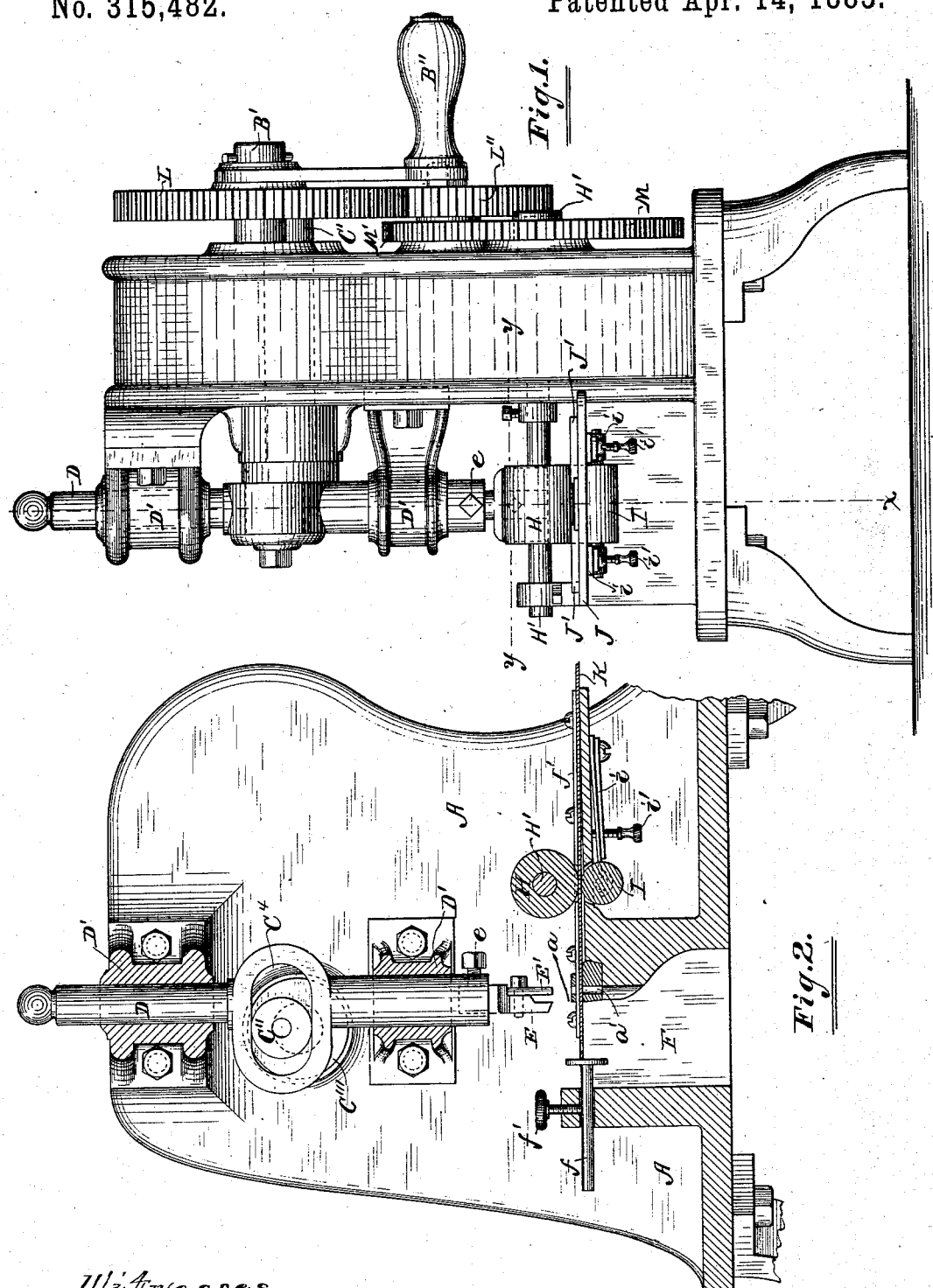

C. COLAHAN.
TAG CUTTING AND PUNCHING MACHINE.

No. 315,482. Patented Apr. 14, 1885.

Witnesses,
Henry Frankfurter
W. L. Baker

Inventor,
Chas. Colahan

UNITED STATES PATENT OFFICE.

CHARLES COLAHAN, OF CLEVELAND, OHIO.

TAG CUTTING AND PUNCHING MACHINE.

SPECIFICATION forming part of Letters Patent No. 315,482, dated April 14, 1885.

Application filed February 11, 1884. (No model.)

*To all whom it may concern:*

Be it known that I, CHARLES COLAHAN, of Cleveland, in the county of Cuyahoga and State of Ohio, have invented certain new and useful Improvements in Baggage-Check or Tag and Ticket Cutting and Punching Machines, of which the following is a specification.

My invention relates to improvements in cutting and punching machines in which vertically-reciprocating dies and cutters operate in conjunction with a fixed die and shearing edge of steel secured to the table below.

The objects of my improvements are, first, to secure a general arrangement and construction of parts to make the machine convenient of access in all of its parts while at work by the hands of its operator; second, to afford means for regulating the feed that forces the ribbon or band of material forward on the table to the cutting and punching die. I attain these objects by the mechanism illustrated in the accompanying drawings.

Figure 3:
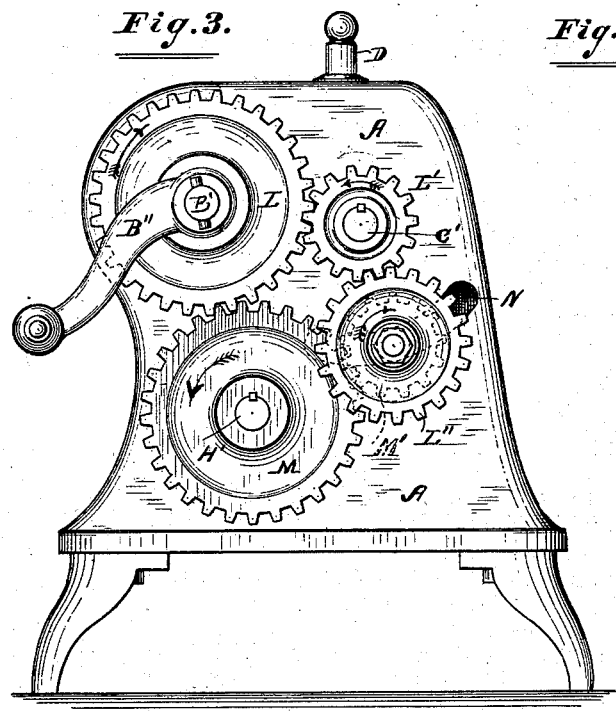
Figure 4:
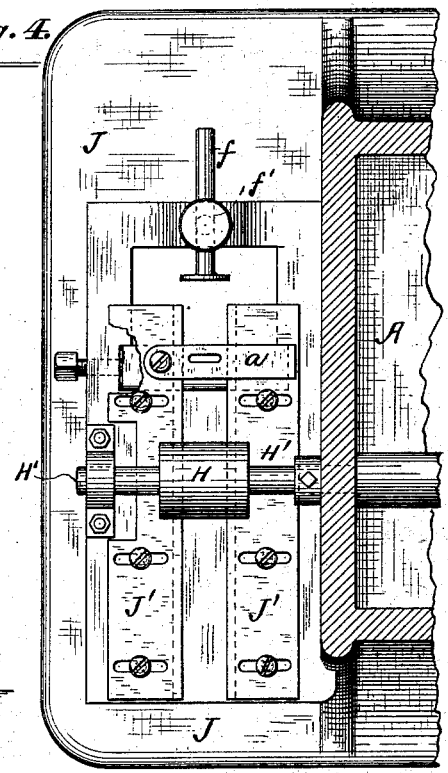
Figure 7:
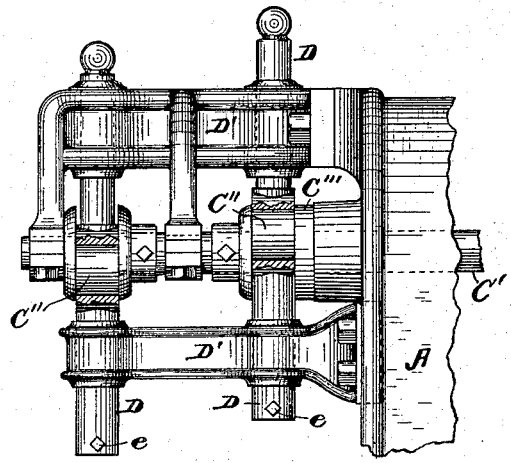
Figure 5:
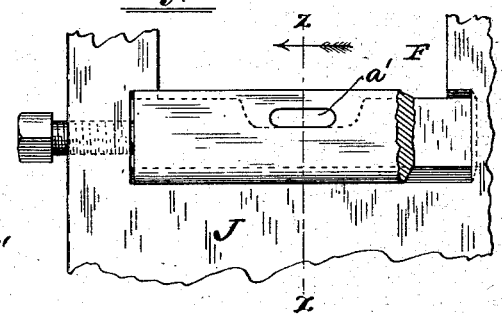
Figure 6:
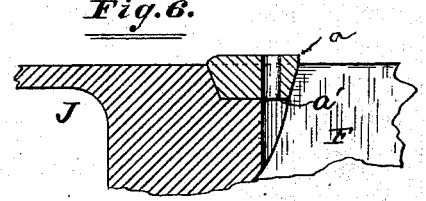

Figure 1 represents an end view of the machine at right angles to Fig. 2, showing the actuating gearing and crank. Fig. 2 is a vertical section on line X, Fig. 1, showing the reciprocating die and its operating-crank; also the stationary and fixed die thereunder at the surface of the table, and the feed-rollers between which the material is forced along the table under the reciprocating die. Fig. 3 is a view on side opposite to that represented in Fig. 2, and shows the arrangement of the stationary and changeable gearing operating and regulating the machine. Fig. 4 is a top view. Figs. 5 and 6 are sectional views of the stationary die and the means of securing and releasing it, as desired. Fig. 7 represents a crank-shaft with two vertically-reciprocating dies thereon.

Similar letters refer to similar parts throughout the several views.

A represents the main standard or frame of the machine, which may be supported on legs or standards. B' B" are the power-wheel shaft and its hand-crank. C' is the crank-shaft actuating the crank C", which operates the vertically-reciprocating dies and cutter. D represents the perpendicular shafts carrying the die and cutter in their vertical reciprocal movements in guides D' D', secured to standard A. C" is the crank on shaft C', which revolves in aperture C⁴ of die-shaft D, imparting its vertical movements through its bearings or guides D' D'. E is the cutting-knife. E' is the punching-die. F is the open receptacle for permitting the discharge of the manufactured checks or tags. H is the feed-roller fixed firmly in bearings above the table. I is the lower anti-friction feed-roller revolving in flexible journal-supports located below the table J. J' J' are adjustable guides, which can be regulated to suit the various widths of the ribbon material to be cut and punched. L is the main driving-wheel. L' is gear-wheel on crank-shaft C'. M is the upper or feed-forcing gear-wheel on shaft H'. M' is the speed-regulating gear-wheel secured to same shaft as gear-wheel L", which is actuated by wheel L'. This feed-regulating gear-wheel M' is removable, and is made of several sizes, and is secured, by means of a nut on inner end of shaft, which extends through said slot in frame A, in the slot N, which admits of the ready change and use of the different sizes of gear-wheels to regulate the speed of the feed-roller and control the length of the cut to the card. *a* is the cutting-edge of the stationary die, against which the card is cut as the knife E passes by in its reciprocations. *a'* is the aperture in the lower die, through which the punching-die E' passes, thus punching and cutting the card-ribbon of any desired length as regulated in its operation. The stop-bar *f* serves as a temporary stop to the material as the same comes in contact therewith in the process of cutting and punching the same. In some cases it may be desirable to connect both feed-rollers by gearing to insure a positive forced feed of the material from which the checks or tags are cut, and to secure an unfailing presentation of the said material to the operation of the die, and I secure, by means of any ordinary adjustable spring supporting the journal-bearings, as shown at *i i'*, a yielding facility in the rollers; or the rollers may be connected and operated by the devices shown in Patent No. 215,322, granted to me May 13, 1879; and should it be desirable a type-faced roller may be used at H, and be supplied by an inking-roller, and thus print or number the checks or tags, when so required, while in the process of cutting.

In operation the machine is placed upon a table of convenient height, it being light and portable, and the attendant will turn the crank B″ with his right hand, while with his left hand he will insert one end of the cardboard ribbon K, or material from which the checks are to be made, on the table between the guides J J′, and under the feed-roller H and over the yielding friction-roller I, which rollers will force or carry the material forward as the machine is operated by the hand of the attendant, and as the material passes over the die the reciprocating shaft D, bearing the knife for severing the tag, and the punch-plate for cutting the strap-hole in the the tag, will descend upon the advancing material, and at a single stroke form therefrom a complete tag or check, at the rate of thousands per hour. The length of the check can be made longer or shorter by the use of interchangeable gear-wheels L″ M′, which gear causes the feed-roller to revolve faster or slower, while the reciprocating shaft D continues unchanged in its rate of speed, and its knife and punch will cut and punch the material with unfailing regularity as presented.

Having thus described the construction and operation of my invention, what I claim, and desire to secure by Letters Patent, is—

1. In an automatic punching and cutting machine, the combination of the gear-wheels L L′ L″ M M′ with the shaft c′, operating the shaft D and its punch and cutter, and shaft H′, operating the feed-rollers, substantially as shown and described.

2. The combination of the interchangeable feed-gear wheels L″ M′, adjustably secured in the circular slot N, and the wheel L′, in combination with the shaft C′, and the vertically-reciprocating shaft D and its die and cutter, with the feed-rollers H I, whereby the machine may be regulated, as and for the purposes shown and described.

CHARLES COLAHAN.

Witnesses:
A. M. STOUT,
FRANK O. COOK.